June 6, 1933.  H. T. KRAKAU  1,912,646
SHOCK ABSORBING MECHANISM
Filed Dec. 7, 1929  5 Sheets-Sheet 1

Inventor:
Harry T. Krakau
By his Attorney

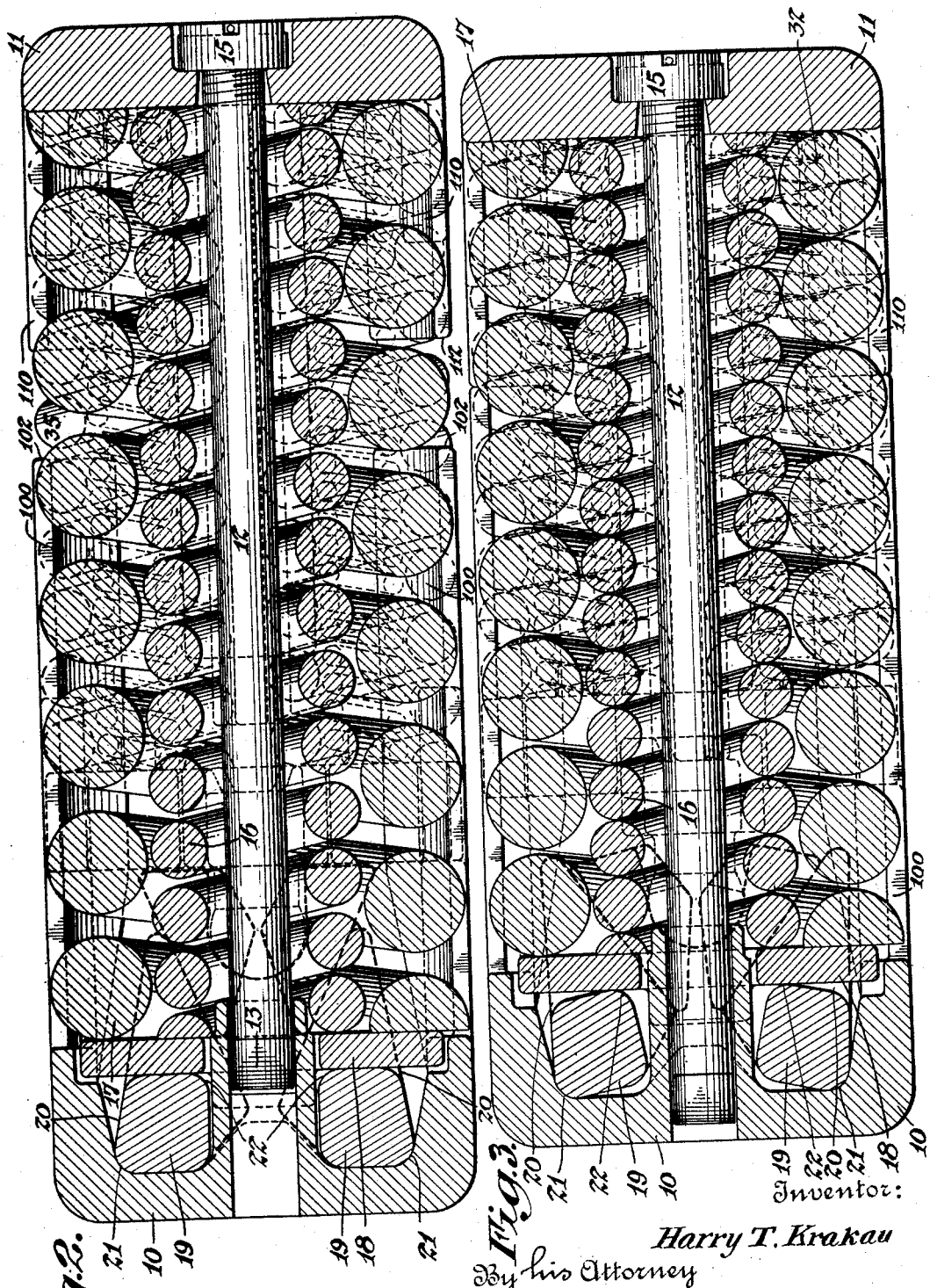

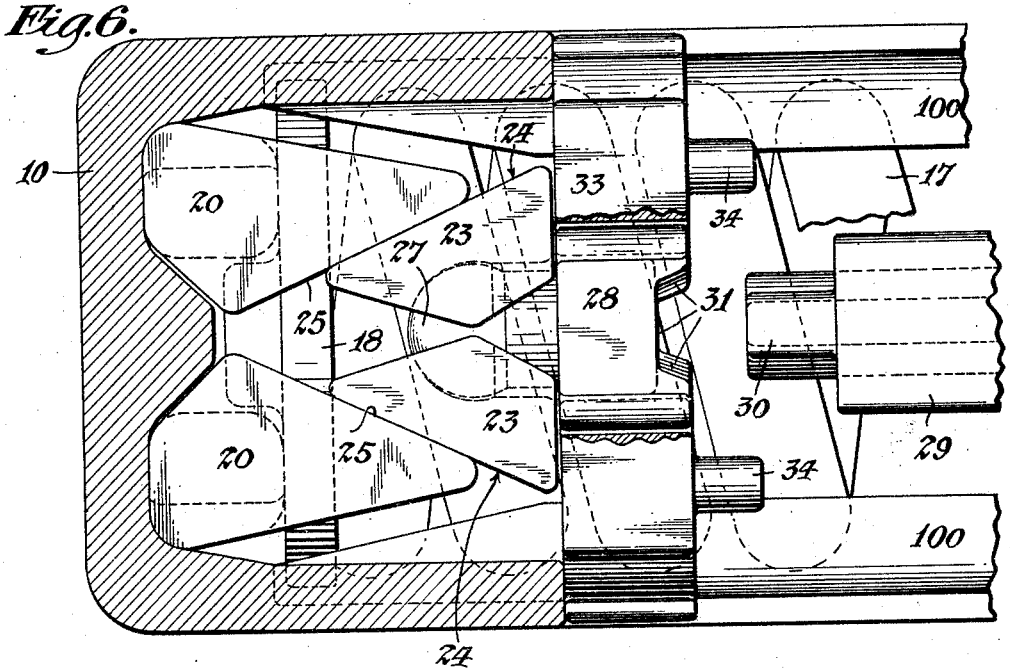
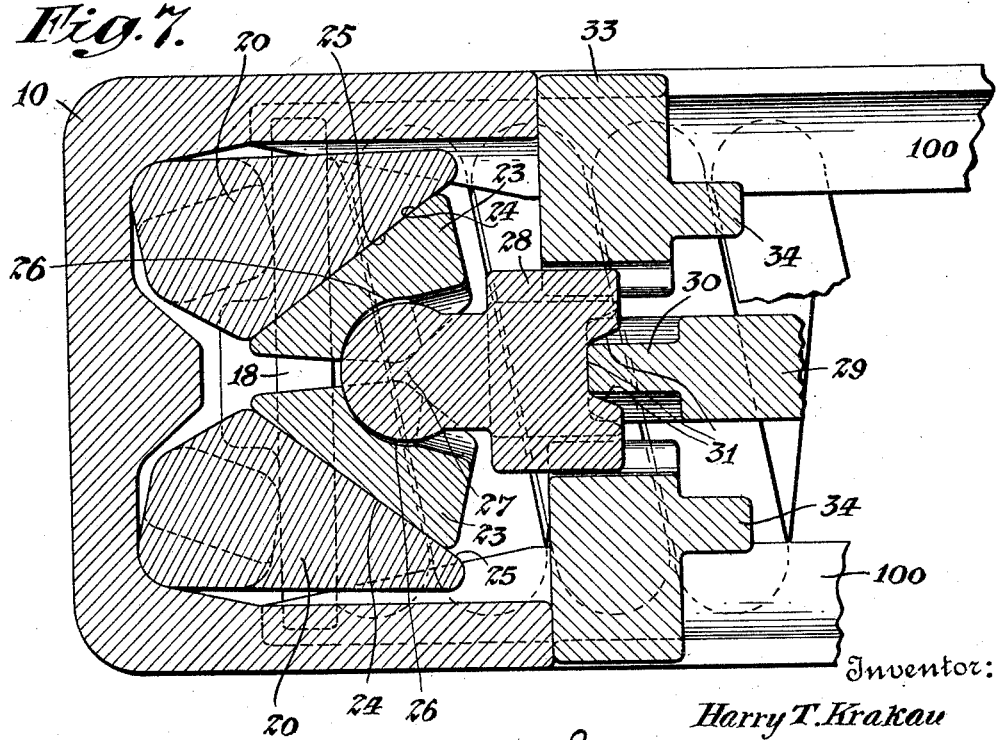

June 6, 1933.  H. T. KRAKAU  1,912,646
SHOCK ABSORBING MECHANISM
Filed Dec. 7, 1929  5 Sheets-Sheet 5
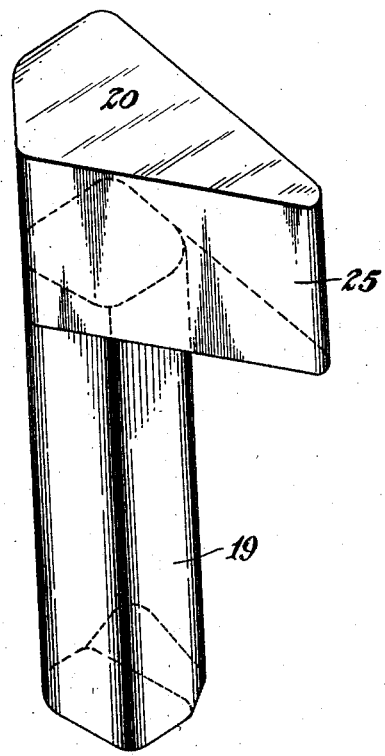
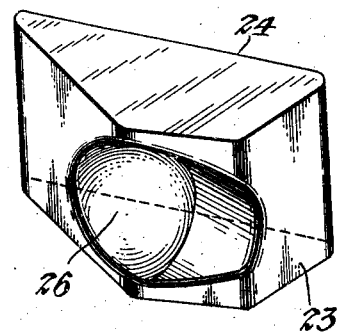
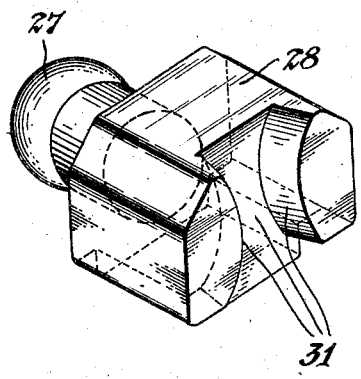
Inventor:
Harry T. Krakau
By his Attorney
Clarence Kerr Patented June 6, 1933

1,912,646

UNITED STATES PATENT OFFICE

HARRY T. KRAKAU, OF CLEVELAND, OHIO, ASSIGNOR TO NATIONAL MALLEABLE AND STEEL CASTINGS COMPANY, OF CLEVELAND, OHIO, A CORPORATION OF OHIO

SHOCK ABSORBING MECHANISM

Application filed December 7, 1929. Serial No. 412,378.

The invention relates to improvements in shock absorbing devices, such as are utilized in connection with the draft systems of railway cars, particularly those employed in passenger service to bring about a smooth transmission of the draft and buff reactions.

Various schemes have been devised in the past for taking up the shocks encountered in the handling of railway cars, which would otherwise be imparted to the main car structure due to sudden variations in the draft forces, either by way of acceleration or deceleration, or due to buffing, or the sudden application of brakes and the like. Devices of this sort which have been used in the past have embodied a combination of springs and frictional reactions to absorb or cushion at least a portion of the shock. For passenger service, however, devices employing a relatively large amount of frictional cushioning and a correspondingly small amount of spring action have not been found satisfactory for the reason that the stiff or unyielding frictional resistance of such gears, particularly at high train speeds, transmits to the car many of the running shocks and engine pulsations.

It has been the common practice heretofore to rely upon the springs to take care of only a relatively small portion of the normal operating load imposed upon the draft gear and to rely upon the frictional devices to take care of the balance of this load. Due to the uneven distribution of the draft or buff pressures, brought about by the movement of the cars around a curve or due to the effects of long sustained heavy tractive effort of the locomotive on grades, it has been found that the frictional devices have a tendency to creep and that frequently such gears in time creep "solid". This tendency of draft gears to creep solid has seriously limited the efficiency of the gears and has served to destroy, in a large measure, their shock absorbing characteristics. Furthermore, when the frictional devices have taken effect during the normal operation of the gear, as when a train is in motion, they do not respond readily to the draw-bar pull of the locomotive but the parts have had a tendency to stick until the variation has brought about a sufficient change in the force applied to the friction devices to cause a rather sudden readjustment of the parts. This reaction has, therefore, tended to destroy the desired smoothness and uniformity of operation of the gear.

A principal object of the present invention has been to overcome these difficulties previously encountered and to provide a gear which is smooth in its operation and very responsive to changes in locomotive draw-bar pull. In the achievement of this result, and the development of a more efficient shock absorbing system, the invention embraces the use of stronger springs than have been commonly employed in the past so that the cushioning capacity of the gear consists largely of spring action supplemented by a considerably less amount of frictional cushion. The frictional devices are required mainly to absorb the shocks of sudden changes in the buff and draft pressures due to the coupling of cars or to sudden starting and stopping of trains, or the like, and they are not brought into play until the springs have been compressed to a substantial degree.

An important feature of the invention is the improvement in the arrangement, construction and mode of operation of the frictional devices. These have been so devised as to be reliable and uniform in their action under all conditions of service. The construction is such, furthermore, that the frictional forces offer rather mild resistance at the outset but build up rapidly to a reaction of considerable magnitude as the opposed members of the draft gear are brought together under sudden buff or draft reactions. An advantage of this construction is that in the normal starting and stopping of trains, where the load imparted to the draft gear is only slightly in excess of the normal draft load with the train in motion, the frictional devices will act more gently to bring about the desired smoothness of operation. However, where the buff and draft reactions become more violent, they are offset more forcibly by the rapidly increasing magnitude of the frictional reaction. This increase in the frictional forces is not merely such as would arise from the gradual increase in the pressure between the surfaces of the frictional members, due to the greater compression of a spring, but it is augmented to a further degree by a change in the angularity of the frictional surfaces with respect to the direction of application of the draft or buff force. As the parts of the draft gear approach a solid contact, the angularity of the frictional surfaces increases to the point where the frictional resistance is considerable.

Other objects and advantages of the invention, in the way of simplifying the construction and rendering it more effective for its intended use, will be made apparent from the detailed description of the invention, which will now be given in connection with the accompanying drawings, in which:

Figure 2 is a longitudinal, vertical section through the device taken along the line II—II of Figure 1.

Figure 3 is a view similar to Figure 2 but shows the parts in a completely compressed condition.

Figure 6 is a detail view in elevation, partly in section and slightly enlarged, taken along the line VI—VI of Figure 1.

Figure 7 is a detail view in section showing the parts illustrated in Figure 6 but in their fully compressed positions.

Figure 8 is a perspective view of one of the frictional elements of the device.

Figure 9 is a perspective view of another cooperating frictional element.

Figure 10 is a perspective view of a plunger or equalizing device which co-operates with the element shown in Figure 9.

Figure 1:
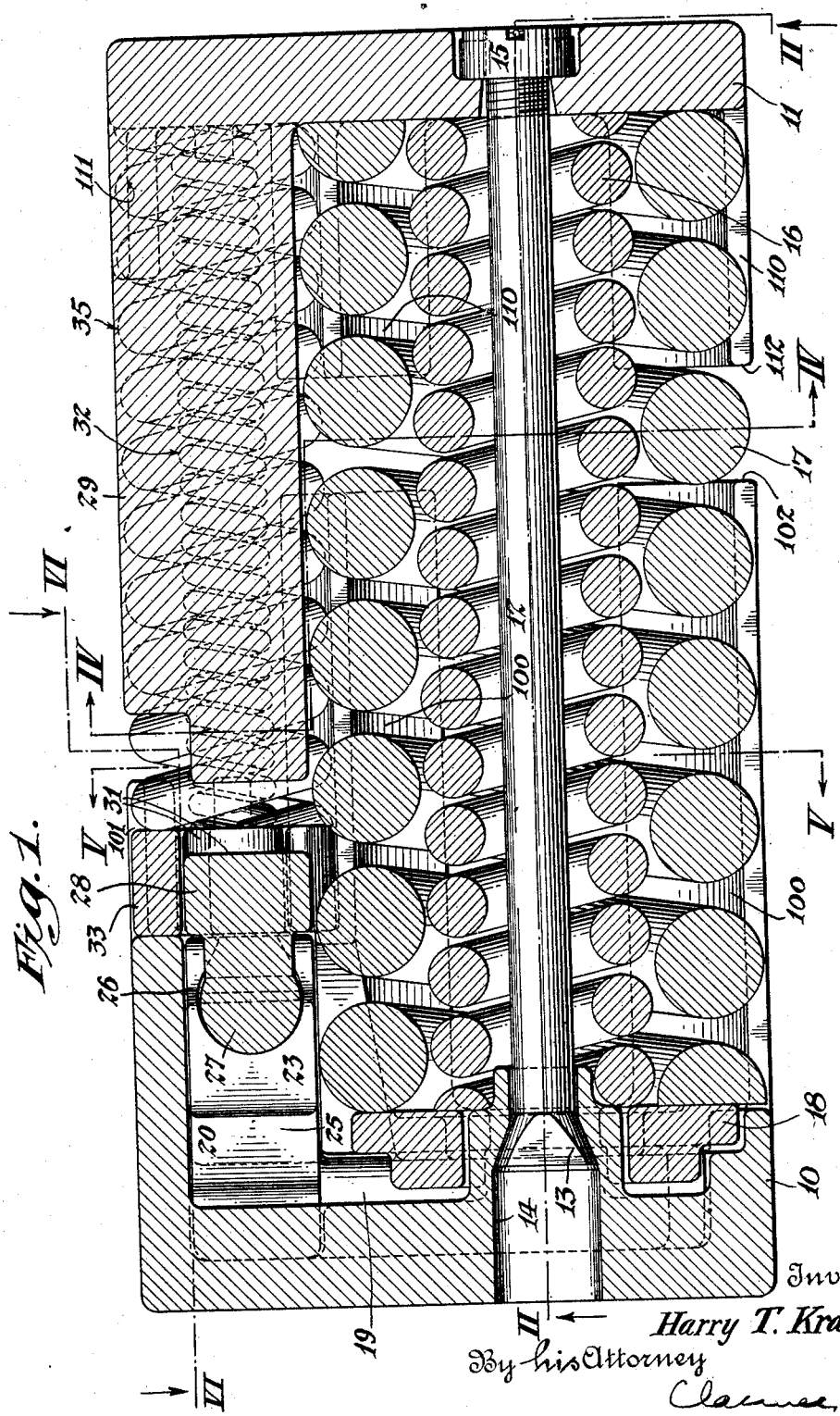
Figure 1 is a horizontal section through substantially the midpoint of the shock absorbing system.
Figure 4:
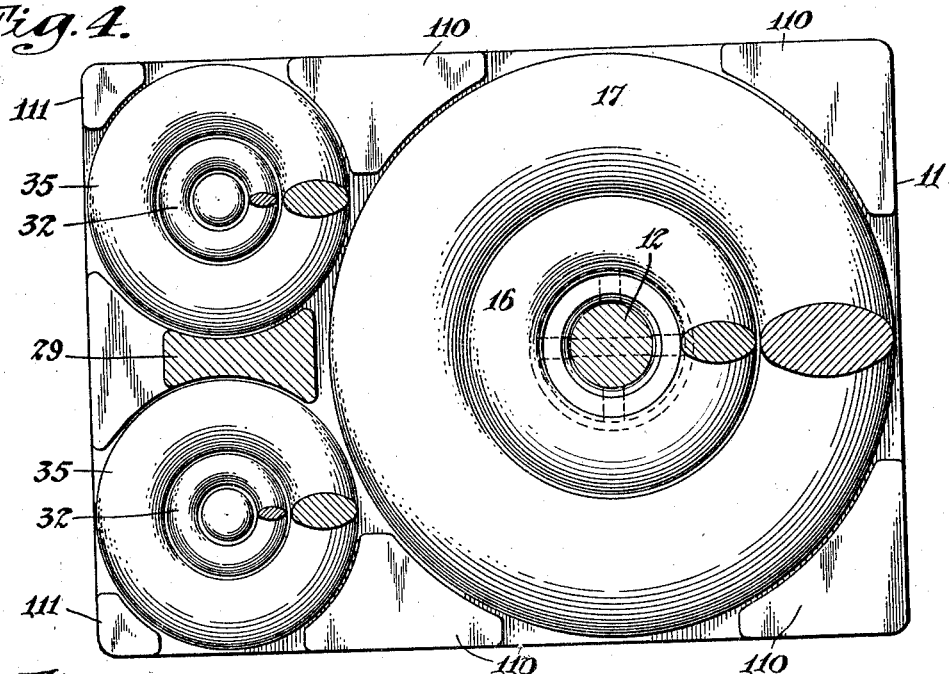
Figure 4 is a traverse sectional view through the device along the line IV—IV of Figure 1.
Figure 5:
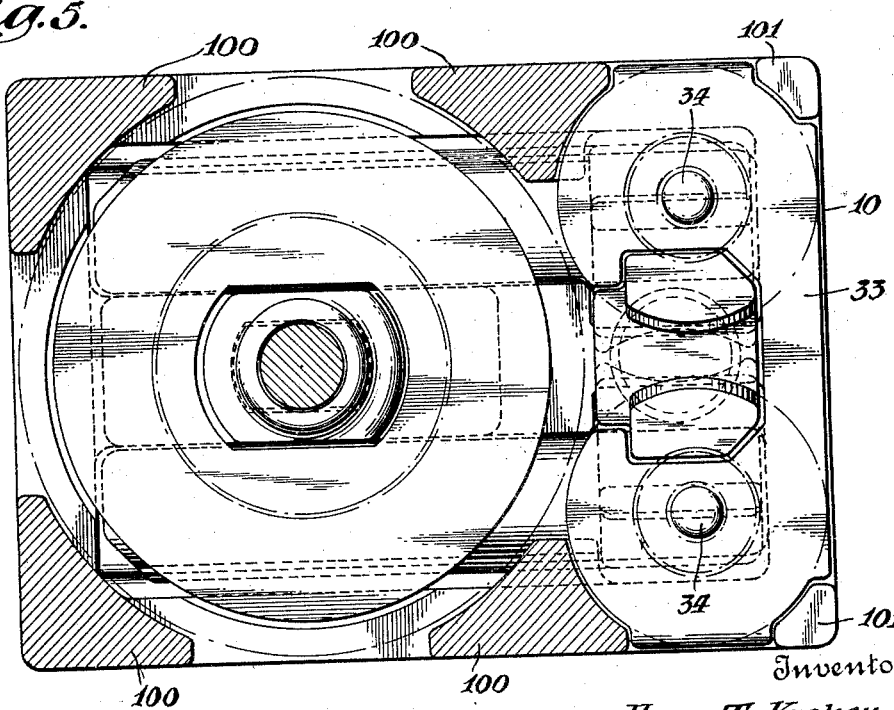
Figure 5 is a similar traverse view taken along the line V—V of Figure 1, but with the springs removed.

Referring now particularly to Figures 1 to 5, inclusive, the device may be largely enclosed by a pair of housing members or casings 10 and 11. These members are provided with bases which, in the assembly, are opposed to one another and are provided with suitable projecting wall sections or extensions 100, 101, 110 and 111 to partially enclose and guide the various interior parts and to carry all oversolid loads. The two members of the casing are held together in predetermined relation by means of a tie-rod 12 having an enlarged head 13 at one end co-operating telescopically with an opening 14 in the base of the member 10. At its opposite end the rod is preferably provided with a collar 15 which may be screwed on or secured to the rod by any other suitable means. The length of the tie-rod is such that the two housing members may be separated to a certain extent so that there is a predetermined space between any aligned shoulders of the two. A normal distance of, say, approximately two inches may be provided between the various aligned shoulders or ends of projections which, under conditions of excessive load, may be brought together.

Within a main longitudinal recess formed by the projections 100 and 110 of the pair of casing members, there is located a spring 16 of relatively small diameter immediately surrounding the tie-rod 12. At its opposite ends this spring may co-operate with portions of the bases of the casings to assist in normally holding them in their maximum extended positions. Surrounding the spring 16 there is provided a larger spring 17 co-operating at one end with the base of the housing member 11 and at its opposite end with a follower plate 18. This spring also assists in holding the two housing members separated and offers a substantial resistance to a movement of one of these members toward the other. The follower plate 18 may co-operate also with one end of the spring 16; it does not co-operate directly with any portion of the housing 10 but, as best shown in Figures 2 and 3, co-operates with elongated extensions 19 formed integral with a pair of friction blocks 20 (see Figure 8). These friction blocks are substantially identical in form except that they are right and left-handed with respect to each other. The extensions 19 are preferably substantially rectangular in cross section so that as the members 20 are rocked about a pivotal surface 21 formed in the base of the casing 10, in a manner to be subsequently explained, the rounded corners 22 of the extension will produce a camming action upon the follower plate 18 and act against the springs 16 and 17. Obviously, the extensions 19 may assume any other form in cross section which will bring about this camming action upon the rocking of the friction blocks in the manner to be explained.

The friction blocks 20 may be either triangular or trapezoidal in cross section or may assume any other polygonal form, so long as they constitute substantially rigid bodies capable of withstanding heavy torsional stresses and transmitting the turning force to the extension 19 without twisting of the parts. Co-operating with the friction blocks 20 is a pair of slidable friction wedge elements 23 which, in plan view, present preferably a surface that is substantially trapezoidal or polygonal in form. Each of the slidable wedge elements is provided with a surface 24 co-operating with a surface 25 of an adjacent friction block 20. On the opposite sides of the elements 23 which face each other they are provided with co-ordinated spherical seats 26 adapted to jointly co-operate with a spherical head 27 of a wedge equalizer or plunger 28. This construction is such that any longitudinal movement of the plunger 28 toward the base of the casing 10 will be transmitted to the friction elements 23. At the same time the spherical or ball-joint engagement between the plunger and the friction elements will permit free rotative movement of the elements with respect to the end of the plunger and provide an equalizing action. The purpose of this portion of the construction will be made apparent hereinafter.

In line with the plunger 28 there is provided an elongated extension 29 (Figures 1, 4 and 6) formed integrally with or otherwise secured to the housing member 11 and extending to a point near the plunger 28. The end 30 of the extension 29 is suitably formed to co-operate with the surfaces 31 on the face of the plunger to properly align the latter in case it is slightly off center and to transmit a direct longitudinal blow to the plunger. When the parts are in their normal positions of rest the end 30 is preferably spaced a substantial distance, for example 1⅜″, from the face of the plunger to permit this much relative movement between the casings before the frictional devices begin to take effect.

On each side of the extension 29 there is provided a partial closure of substantially cylindrical formation, formed by the extension on one side and by the projections 100, 101, 110 and 111. These cylindrical pockets are adapted to house a pair of auxiliary helical springs 32 which, at one end, co-operate with the base of the member 11 and at their opposite ends co-operate with a C-shaped retaining member 33. This member is provided with a substantially central opening through which the plunger 28 is permitted to slide and in which the latter is properly guided. The retaining member is further provided with a pair of upstanding projections 34 located in line with the axes of the cylindrical pockets and co-operating with the springs 32 to retain these elements in their proper positions. Insofar as its function is concerned, the member 33 might be formed integral with the casing 10, since it is held forcibly against the latter at all times by means of the springs 32. However, for purposes of assembly of various parts of the system, this member is made as a separable unit. It may be confined against transverse movements in all directions by seating snugly within the space provided between projections 100 and 101. An additional pair of springs 35 of larger and stronger construction may be provided around the springs 32, if desired.

It will be apparent from the foregoing that the two casings 10 and 11 are normally forced apart to the relative position shown in Figure 1 by virtue of the force of all of the springs 16, 17, 32 and 35. The tie-rod 12 serves to prevent any further separation of these members and the tie-rod in this respect is assisted, when the unit is mounted on a car, by the usual stops, not shown, forming a part of the complete draft system. Now, when the gear is subjected to a compressional force, due to the application of draft or buff, the members 10 and 11 will be moved toward each other and the head of the tie-rod 12 will slide telescopically in the opening 14 of the member 10. At the same time the springs 16, 17, 32 and 35 will all be compressed to an extent depending upon the magnitude of the compressional force exerted. According to the preferred construction the combined capacity of these springs is such that all, or most, of the running shocks of buff and draft are cushioned by the springs without the aid of the friction mechanism. The friction mechanism in such a case would receive the force of a shock only after all, or most, of the normal operating pressures are exceeded. It is obvious, however, that the capacity of the springs may be varied to suit the particular needs of the class of service in which the gear is to be used. The normal distance between the end of extension 29 and plunger 28 may likewise be varied so as to bring the frictional parts into action at any predetermined point in the gear travel. In any event, it is desired to cushion the normal running shocks mainly, if not altogether, by spring resistance, and to have a reserve frictional action to assist the springs under the heavier shocks. By this means it is insured that all variations in the draw-bar pull of the locomotive will be transmitted at once in a smooth manner to the draft gear so that no undue jars or vibrations will be felt in the cars. This is particularly desirable where the gear is employed in passenger service.

Assuming now that the load placed upon the gear is in excess of that normally encountered during running conditions, such as during buffing operations or sudden starting or stopping of the train, the free capacity of the springs may be exceeded and the extension 29 will then engage the base of the plunger 28 and force the latter toward the base of the housing member 10. This will serve to carry the friction wedge elements 23 in the same direction and will cause the sliding of the surfaces 24 along the surfaces 25 of the friction blocks 20. At the outset this frictional force will be comparatively small due to the relatively small angle between the surfaces 25 and the main axis of the device, and due to the relatively small initial pressure between the friction surfaces on account of the comparatively light resistance of the springs 16 and 17 to the turning of the extensions 19 at this time. However, as the elements 23 slide along the surfaces of the blocks 20 the latter will be rocked about their pivotal points 21 against the action of the springs 16 and 17, which must be compressed even further as a result of the camming action of the extensions 19. By virtue of the rocking of the friction blocks, the surfaces 25 will assume a constantly increasing angle to each other and to the direction of movement of the plunger 28. This will bring about an ever increasing frictional force which builds up rapidly toward the end of the movement of the parts until a considerable resistance is offered. Throughout this further movement of the casings the series of springs will be further compressed and will contribute to an increase in the pressures between the friction surfaces. Where the buff or draft shock is quite severe, the opposed shoulders 102 and 112 of the extensions 100, 101, 110 and 111 of the two housing members 10 and 11, respectively, will finally come into direct contact but such engagement will only be effected after a considerable frictional resistance has been introduced to absorb a large portion of the shock. As soon as the excessive shock disturbance has passed, the series of springs 16, 17, 32 and 35 will restore the casings to a point commensurate with the normal buff or draft force which may be continued. This will normally be such that the projection 29 is withdrawn from the face of the plunger 28 and will permit the frictional devices to become inactive. The springs will then assume the entire load imposed upon the draft gear.

While one admirable form of draft gear has been shown in the drawings and described in the foregoing sections in considerable detail, it is to be understood that this disclosure is for the purposes of illustration only and that many modifications may be effected without departing from the spirit and scope of the invention. It has been stated as preferable to employ springs of sufficient capacity to cushion the normal shocks applied to the draft gear; however, it should be understood that many of the advantageous features of the invention may be obtained and utilized in constructions in which a part of the normal load is borne by the frictional devices as well. Many other modifications may be made, all falling within the scope of the claims which follow.

What I claim is:

1. In a shock absorbing mechanism a pair of casings, resilient means between said casings to normally hold them apart, frictional devices mounted wholly within one of said casings, and a device carried by the other casing for operating said frictional devices to resist the relative movement of the casings, said frictional devices having cooperating surfaces at gradually varying angles to the direction of movement of said casings.

2. In a shock absorbing mechanism a pair of casings, resilient means between said casings to normally hold them apart, frictional devices mounted wholly within one of said casings, and a device carried by the other casings, and a device carried by the other casings for operating said frictional devices to resist the relative movement of the casings, said frictional devices having co-operating surfaces at an angle to the direction of movement of said casings, said angle increasing gradually as the casings approach each other.

3. In a shock absorbing mechanism a pair of casings, resilient means normally holding said casings separated, frictional devices adapted to resist relative movements of said casings, said devices having co-operating surfaces at an angle to the direction of movement of the casings, and the angularity of said surfaces increasing gradually as the casings approach each other.

4. In a shock absorbing mechanism a pair of casings, a spring for holding said casings apart, and frictional devices within said casings urged into frictional engagement by said spring and adapted to resist relative movement between said casings, said devices being so mounted with relation to each other and to said spring as to create a variable pressure between the friction surfaces which increases at a more rapid rate than the compressional force stored in said spring.

5. In a shock absorbing mechanism a pair of casings, a spring for holding said casings apart, and frictional devices within said casings adapted to resist relative movement therebetween, said devices co-operating with said spring to create a variable pressure between the friction surfaces, said surfaces being arranged at a variable angle to the direction of movement of said casings, whereby the frictional resistance builds up at a more rapid rate than the compressional force of said spring.

6. In a shock absorbing mechanism a pair of relatively movable casings, a compression spring within said casings, a rockable friction member carried by one of said casings, a co-operating tiltable friction element, and means for sliding said tiltable element along a surface of said member to rock the latter upon relative movement of said casings.

7. In a shock absorbing mechanism a pair of relatively movable casings, a compression spring within said casings, a rockable friction member carried by one of said casings, a co-operating tiltable friction element, said member and element having co-operating surfaces at an angle to the direction of movement of the casings, and means for sliding said element along said member to rock the latter and thereby alter the angle of said surfaces upon relative movement of said casings.

8. In a shock absorbing mechanism a pair of relatively movable casings, a spring for holding said casings apart, a plurality of co-operating friction elements carried by one of said casings and urged into frictional engagement by said spring, a plunger slidable in said casing and engaging one of said elements, and a projection carried by the other of said casings and adapted to engage said plunger to shift said elements relative to each other upon relative movements of said casings.

9. In a shock absorbing mechanism a pair of relatively movable base members held together by a tie-rod, a spring element surrounding said rod and tending to hold said base members apart to the extent permitted by said rod, said spring being of maximum capacity permitted by the outer limits of the shorter dimensions of said base members, and projections formed integral with said base members and extending parallel to said spring to partially enclose the latter and to limit relative movement of said base members.

10. In a shock absorbing mechanism a pair of relatively movable casings, a spring for holding said casings apart, a plurality of co-operating friction elements carried by one of said casings and urged into frictional engagement by said spring, a plunger slidable in said casing and engaging one of said elements, and a projection carried by the other of said casings normally out of engagement with said plunger but adapted to engage the latter and shift said friction elements relative to each other after a predetermined relative movement of the casings.

11. In a shock absorbing mechanism a pair of relatively movable casings, a spring for holding said casings apart, a plurality of co-operating friction elements carried by one of said casings, a plunger slidable in said casing and engaging one of said elements, and a projection carried by the other of said casings and adapted to engage said plunger to shift said elements relative to each other upon relative movements of said casings, one of said friction elements being rockable and presenting a surface to another of said elements which is at an angle to the direction of movement of said casings.

12. In a shock absorbing mechanism a pair of relatively movable casings, a spring for holding said casings apart, a plurality of co-operating friction elements carried by one of said casings, a plunger slidable in said casing and engaging one of said elements, and a projection carried by the other of said casings and adapted to engage said plunger to shift said elements relative to each other upon relative movements of said casings, one of said friction elements being rockable and presenting a surface to another of said elements which is at an angle to the direction of movement of said casings, said angle increasing as said casings approach each other.

13. In a shock absorbing mechanism a pair of relatively movable casings, a pair of rockable friction members mounted in said casings, a compression spring co-operating with said members to resist rocking of the same, friction means co-operating with said members, said means and members having co-acting surfaces at an angle to the direction of movement of said casings, and means for shifting said friction means relative to said members on relative movement of said casings.

14. In a shock absorbing mechanism a pair of relatively movable casings, a pair of rockable friction members mounted in said casings, a compression spring co-operating with said members to resist rocking of the same, friction means co-operating with said members, said means and members having co-acting surfaces at an angle to the direction of movement of said casings, and means for shifting said friction means relative to said members on relative movement of said casings, said last mentioned means permitting rocking of said members and friction means to change the angle of said surfaces as said casings approach each other.

15. In a shock absorbing mechanism for draft gear a pair of casings, a spring normally holding said casings apart, said spring being capable of transmitting all of the normal operating pressures of the gear, and frictional devices in said casings forced into frictional engagement by said spring and adapted to receive the force of a shock only after said normal operating pressures are exceeded.

In testimony whereof, I have signed my name to this specification this 5th day of December, 1929.

HARRY T. KRAKAU.